Oct. 12, 1971     IKUO TAKAMATSU     3,611,545
METHOD FOR CONTINUOUSLY PRODUCING A SLIDE FASTENER CHAIN
Original Filed July 23, 1968                5 Sheets-Sheet 1
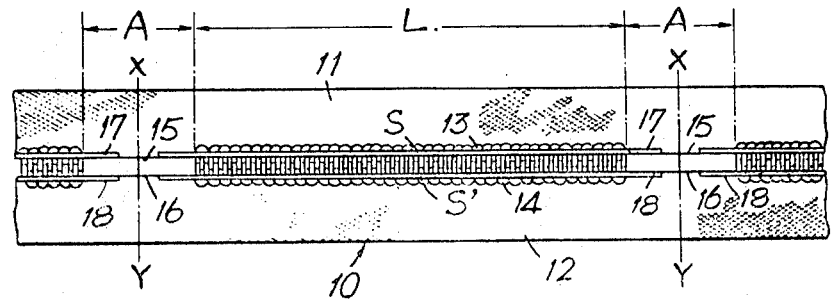
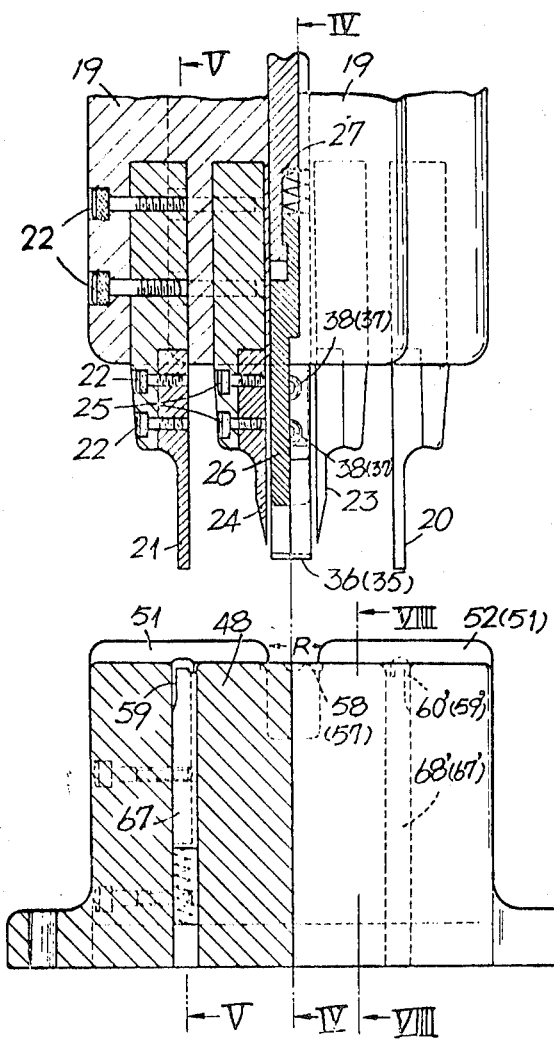

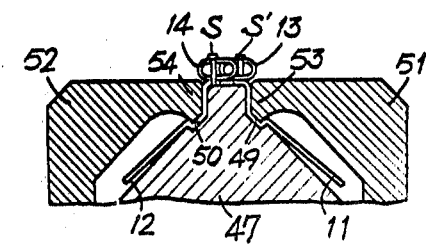
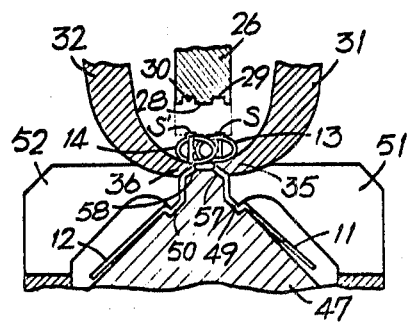
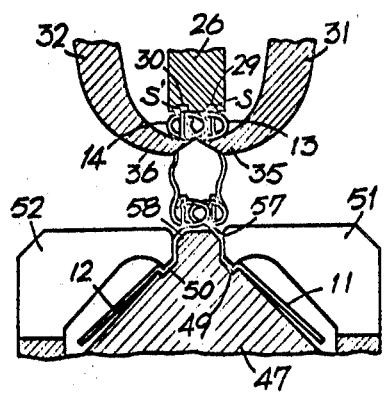
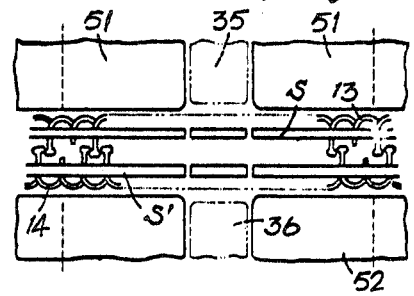
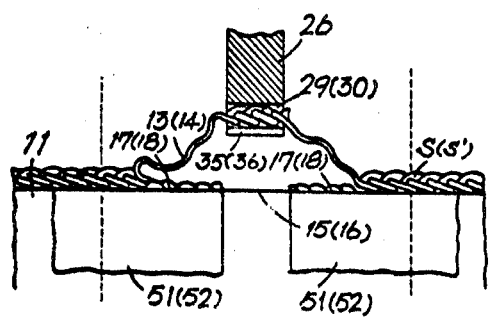
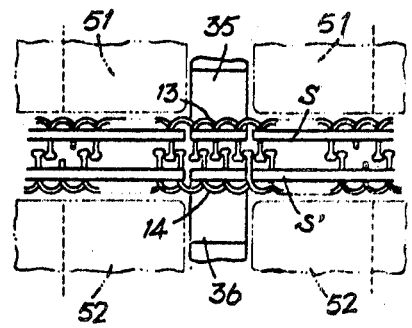

United States Patent Office 3,611,545
Patented Oct. 12, 1971

3,611,545
METHOD FOR CONTINUOUSLY PRODUCING A SLIDE FASTENER CHAIN
Ikuo Takamatsu, New York, N.Y., assignor to Yoshida Kogyo Kabushiki Kaisha, Tokyo, Japan
Original application July 23, 1968, Ser. No. 746,952, now Patent No. 3,540,090, dated Nov. 17, 1970. Divided and this application June 25, 1970, Ser. No. 49,890
Claims priority, application Japan, Feb. 24, 1968, 43/11,657
Int. Cl. B23p *15/00, 19/04*
U.S. Cl. 29—408
1 Claim

ABSTRACT OF THE DISCLOSURE

A method for producing slide fastener chains comprises providing a pair of opposed carrier tapes each having therealong a row of fastener elements secured to the carrier tapes by sewing threads and then removing longitudinally spaced-apart groups of the fastener elements so that sliders may be easily mounted on the carrier tapes to thereby form slide fastener chains. The groups of fastener elements are removed by punching out the coupling portions of adjacent intermeshed fastener elements and cutting the sewing threads securing these fastener elements to the carrier tapes thereby forming a blank tape portion devoid of fastener elements.

---

This is a division of my copending application, Ser. No. 746,952, filed on July 23, 1968 and now Pat. No. 3,540,-090, issued Nov. 17, 1970.

The present invention relates to a method for producing a slide fastener chain, and it has for its object to provide a new and useful method for continuously producing a row of intermeshed fastener elements on each of two carrier tapes, the carrier tapes having blank tape sections at predetermined longitudinally spaced-apart intervals for inserting a slider therethrough, and having sewing thread sections devoid of fastener elements and serving to guide the slider into position on the fastener.

There have hitherto been proposed slide fastener chains having their elements alone cut and removed at suitable intervals from the stitchings that hold them to the carrier tapes, or having both elements and stitch sections removed from the individual fasteners to be manufactured.

These fastener chains render it difficult to mount the slider on the fastener on account of the humps of residual stitching threads or debris of the severed elements which tend to prohibit the entry of the slider.

This difficulty is eliminated in the fastener chain produced in accordance with the invention.

Briefly stated, the fastener chain of the invention comprises a pair of carrier tapes each carrying a row of interlocking elements, each tape including a blank space section at predetermined longitudinally spaced-apart intervals and contiguous with that stitch portion which is devoid of interlocking elements and which continues linearly from the row of sewing threads that secure the elements to the tape.

The objects and features of the present invention will become apparent from the following description taken in connection with the accompanying drawing in which:

FIG. 1 is a plan view of a fastener chain embodying the present invention;

FIG. 3 is a front elevation partially in section of the apparatus in FIG. 2;

Figure 4:
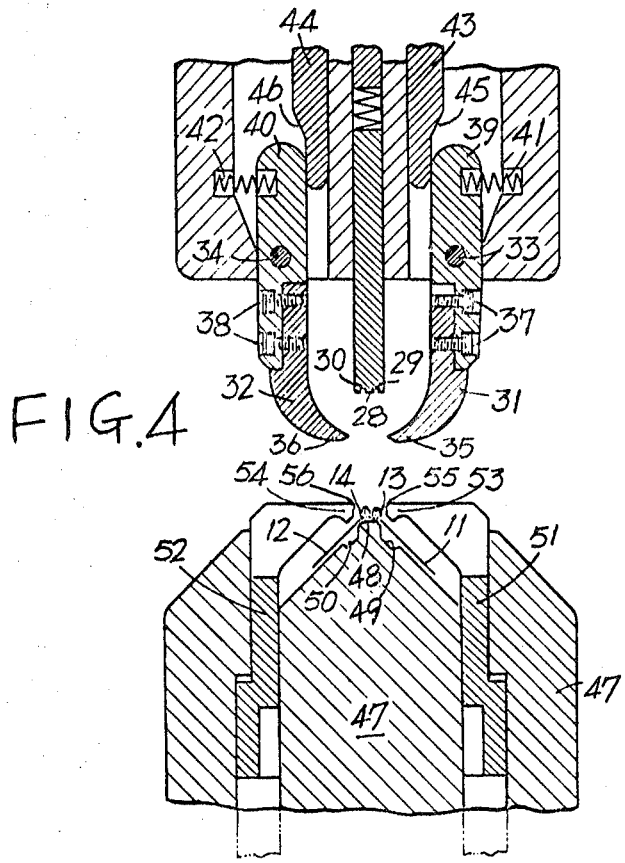
FIG. 4 is a cross-sectional view taken on the line IV—IV of FIG. 3.
Figure 5:
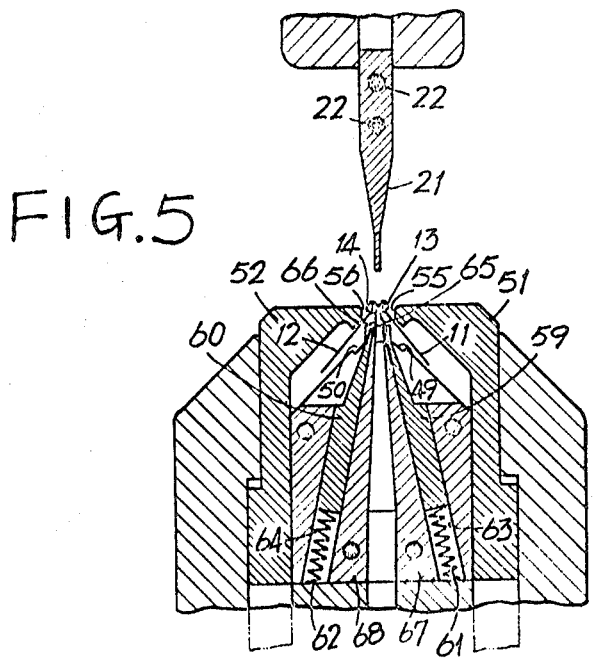
FIG. 5 is a cross-sectional view taken on the line V—V of FIG. 3.
Figure 6:
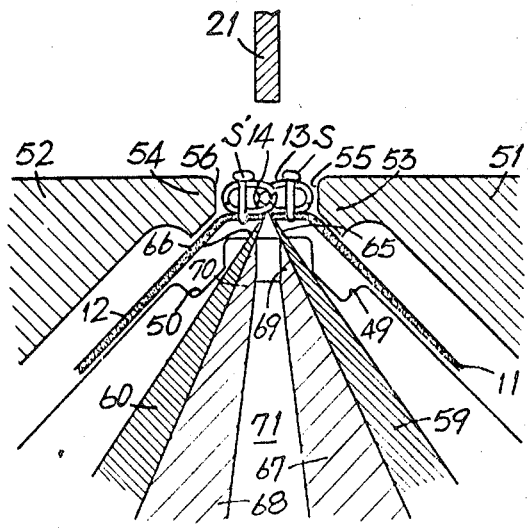
FIG. 6 is a view similar to FIG. 5, illustrating on larger scale a pair of tape openers for splitting apart the opposed tape edges.
Figure 7:
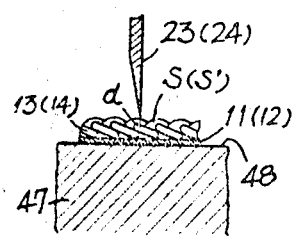
Figure 8:
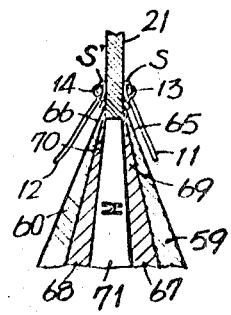

FIGS. 7 through 13, inclusive, are utilized to explain the operation of the apparatus and the sequence of producing a fastener chain according to the invention;

FIG. 7 is an elevational view of a stitch-cutter shown as in cutting position;

FIG. 8 is a view similar to FIGS. 5 and 6, illustrating on larger scale an element-cutter with element chips just severed and removed thereby;

FIG. 9 is a cross-sectional view taken on the line IX—IX of FIG. 3, illustrating on larger scale a mechanism for holding down the fastener stringers during each cycle of operation;

FIGS. 10 and 11 are views similar to FIG. 4 illustrating on larger scale a pair of element scrapers in operation;

FIGS. 12*a*–12*c* are plan views of a fastener chain, utilized to explain the sequence in which it is processed according to the invention; and FIG. 13 is an elevational view corresponding in position to FIG. 11.

FIG. 1 illustrates a typical example of a fastener chain processed and finished in accordance with the invention and such comprises a continuous fastener chain 10 consisting of a pair of carrier tapes 11 and 12 of substantially endless length carrying rows of intermeshed fastener elements 13 and 14. The continuous chain of these intermeshed elements is disrupted and terminated at regularly spaced-apart intervals to leave a blank-space section "A" devoid of fastener elements. This blank-space section of each tape consists of blank central tape portions 15, 16 and element-free stitch portion 17, 18 contiguous therewith and continuing linearly from the rows of sewing threads S, S' which secure the elements to the edges of the tapes 11, 12. The blank-space section "A" is formed at predetermined spaced-apart intervals on the fastener chain and bisected at a mid-point by line X–Y along which the fastener chain is to be cut ultimately into individual slide fastener segments of uniform length L.

The blank-space section "A" featuring the invention is formed by the apparatus which comprises two cooperative units basically illustrated in FIGS. 2 through 5. The first or overhead unit essentially comprises a tool bracket 19 connected to and actuated by a suitable driving source (not illustrated) so as to undergo up-and-down movement under properly timed sequential control coordinated with the operations of the associated operating parts in the second or base unit hereafter described. The tool bracket 19 is provided with a pair of downwardly projecting element-cutters 20 and 21 longitudinally spaced apart by a distance corresponding to the length of the blank-space section "A" of the fastener chain 10 and the cutters are secured in place by means of bolts 22. Each element-cutter has a blade so sized and configured as to fit in between the opposed stitch rows S and S' and to cut and remove the coupling portions of two adjacent intermeshed elements as illustrated in FIGS. 8 and 12*a*.

A pair of stitch-cutters 23 and 24 are secured by bolts 25 to the tool bracket 19 and situated symmetrically between the pair of elements-cutters 20 and 21. The stitch-cutters 23 and 24 are spaced apart by a distance corresponding to the length of the blank stitchless tape portions 15, 16 across the cutting line X–Y, and have their bladed tips terminated at an elevation slightly above the tips of the element-cutters 20, 21. The stitch-cutters are configured to cut the upper stitches that have sewn the fastener elements to the tape fabric in the manner illustrated in FIG. 7 and the stitch-cutters have cutting edges wide enough to cut across the upper stich portions of the stitch rows at the locations indicated by "d" in FIG. 12a.

There is provided a vertically movable hold-down rod 26 in between the stitch-cutters and resiliently held by a compression spring 27. The bottom face 28 of this hold-down member is provided with a pair of longitudinally extending recesses 29 and 30 for receiving thereinto the stitch rows S, S' when the fastener elements are held down by the rod 26 and removed by a pair of element-scrapers 31 and 32 hereafter described. These element-scrapers 31 and 32 are located across the hold-down rod 26 and pivotally connected by pins 33 and 34 to the tool bracket 19. They have inwardly bent blades 35 and 36 secured thereto by bolts 37, 38 and opposed to each other with their tip ends nearly in a horizontal plane and the blades are as wide as the hold-down rod 26. The element-scrapers 31, 32 have their upper end portions 39, 40 normally urged by springs 41, 42 against the lower end portions of cam devices 43, 44 vertically movably supported by the tool bracket 19. In this position, the scraper blades 35 and 36 are separated just wide enough to pose astride over and clear of the opposing intermeshed element rows 13, 14. The cams 43, 44 have respective sloped portions 45, 46 which engage the rounded upper end portions 39, 40 of the scrapers and bring the scraper blades inwardly closer together against the force exerted by the springs 41, 42 when the cams move down and wedge into and between the walls of the tool bracket and the respective upper portions of the scrapers 31, 32.

The second or base unit of the apparatus of the invention is situated below and in a corresponding position to the overhead unit above described. The second unit comprises a stationary machine base 47 having a centrally projecting longitudinal guide-path 48 for the fastener chain 10 and two parallel grooves 49, 50 extending longitudinally along the sides of the guide path 48 the full length of the base 47, a pair of tape grippers 51, 52 mounted on the sides of the base 47 and vertically movable relative to the latter, said grippers having longitudinal hook-like edges 53 and 54 for insertion in the grooves 49 and 50, respectively, and end faces 55, 56 opposed to each other across the guide path 48 and normally defining therewith a channel serving as a guide for the interengaged element rows 13, 14.

Figure 2:
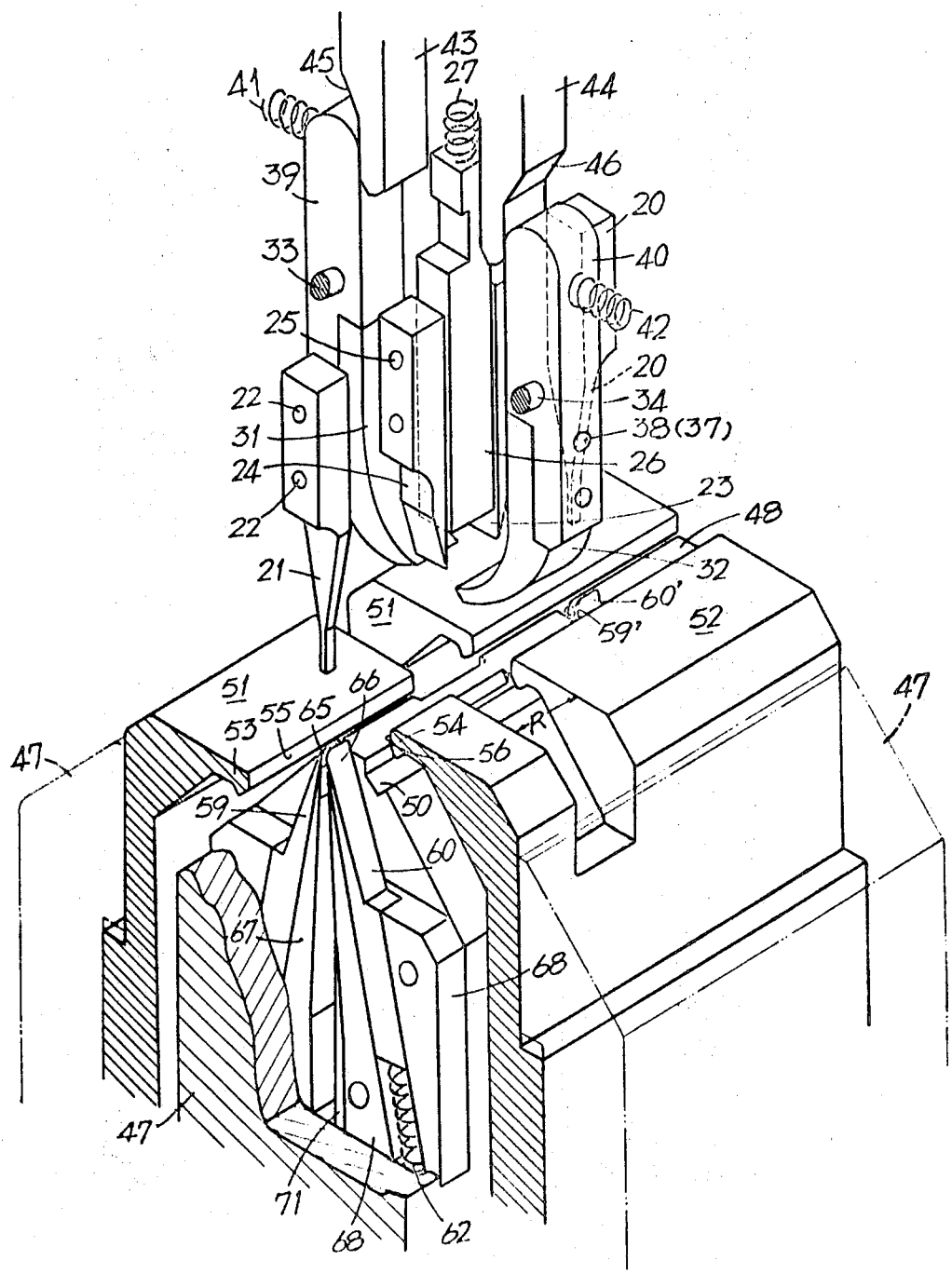
FIG. 2 is a perspective view partially in section of the apparatus employed in accordance with the invention.

The tape grippers 51, 52 are recessed, as at "R" in FIG. 2 or FIG. 3, to permit the element scrapers 31, 32 to pass therethrough to rake the elements off. The longitudinal guide path 48 is provided with shoulders 57, 58 at the corresponding location to the recessed sections "R" of the tape grippers. These shoulders 57, 58 are so sloped as to fit flat with the bladed tip ends of the scrapers 31, 32 as seen in FIG. 10. The guide path 48 is also recessed at two points each coincidental with the working position of each element-cutter, as seen in FIG. 5, where there are disposed a pair of tape openers 59, 60 (59', 60') resiliently supported by springs 61, 62, so as to move under pressure along inclined slots 63, 64 formed inside the base 47. The tape openers 59, 60 have their tip ends 65, 66 tapered and protruded above the guide path 48 so as to thrust into and between the opposed edges of the tapes 11 and 12 when the latter are brought into a working position on the guide path 48. A pair of stationary block members integral with the base 47 and serve as abutments for the tape openers 59, 60. These members have their respective tip ends tapered off to form cutting edges 69, 70 to coact with the corresponding element-cutters 20, 21 to shear off the fastener elements. An aperture 71 is formed between and defined by the block members 67, 68 for the disposal therethrough of the sheared segments of the fastener elements.

Since the tapered tips 65, 66 of the tape openers are normally urged by springs 61, 62 to extend up above the guide path 48, they already come in between the opposed tape edges as the fastener chain is brought into position for initiating the space-forming or gapping operation of the apparatus. The tape openers 59, 60 move gradually apart down the guide slots 63, 64 against the force exerted by the springs 61, 62 as their tip ends 65, 66 are forced downwardly by the descending element-cutters 20, 21. This causes the opposed tape edges to split apart wide enough to allow the element cutters to sever the coupling head portions of two adjacent elements in cooperation with the coacting cutting edges 69, 70 of the block members 67, 68 without impairing the tape fabric.

The apparatus thus constructed may be operated in the manner and sequence which follows with reference to the drawings.

At the beginning of each cycle of the blank-space forming or gapping operation, the tape grippers 51, 52 are held in position with their end faces 55, 56 at the level of the guide path 48 in the base 47. In this position, the end faces 55, 56 and the guide path 48 define a guide channel along and over which interengaged element rows 13, 14 are introduced and aligned in position.

In the first phase of the cycle, the fastener chain 10 is moved over the base 47 until it is brought to a stop at a predetermined point. This chain movement is intermittent and controlled by a control mechanism to be in timed relationship with each cycle of operation of the apparatus. Such a control mechanism is well known in the art and hence, will require no further explanation.

A second phase begins with the descending of the tool bracket 19 along with the element-cutters 20, 21 to force the fastener elements down against the tapered tips 65, 66 of the tape openers 59, 60 whereupon the latter are retracted against the biasing force of the springs 61, 62, causing the opposed tape edges to split apart.

A third phase follows in which the tool bracket moves further down and the longitudinally spaced-apart element cutters 20, 21 each punch through the coupling head portions of two adjacent intermeshed elements in cooperation with the cutting edges 69, 70 and the punched out segments are thrown down the aperture 71, as seen in FIGS. 8 and 12. Simultaneous with this, the stitch-cutters 23, 24 cut across the upper portions of the sewing threads securing the fastener elements to the tapes in the manner shown in FIG. 7.

A fourth phase then takes place with the descending of the tape grippers 51, 52. As the tape grippers descend, the tapes are held down until they are caught between the hook-like edges 53, 54 of the grippers and the parallel grooves 49, 50, as schematically shown in FIG. 12b. This is followed by the fifth phase of the cycle in which the cams 43, 44, move down and wedge into and between the walls of the tool bracket and the element-scrapers 31, 32, causing the scraper blades to move closer toward each other until they intrude into and between the element rows 13, 14 and that tape portion which has been gripped in place, at which time the scraper blades 35, 36 cut the lower stitch portions of the stitchings S, S'. By this time, the hold-down rod 26 has descended sufficiently that it lands on the stitch rows S, S' demarcated between two points at which their upper stitches have already been cut in the third phase of the cycle. The rows of stitchings of this section are received into the bottom recesses 29, 30 of the hold-down rod 26, and the fastener elements in this area of the tape are scooped and pinched firmly between the hold-down face of the rod and the upper faces of the scraper blades that have been closed.

In the sixth phase of the cycle, the tool bracket 19 is lifted with the element-scrapers and hold-down rod ascending therewith and carrying with then the elements and stitches that have been sheared off in the manner illustrated in FIGS. 11 and 13. Thus, by the cooperation of the element-scrapers 31, 32 and the hold-down rod 26, the sheared segments of the fastener chain are released at the two spaced-apart points that have been punched off by the element-cutters 20, 21 and unravel themselves from the sewing thread rows S, S' as seen in FIG. 13, leaving behind a blank-space section A consisting of blank tape portions 15, 16 and element-free stitch portions 17, 18 on each carrier tape. Subsequently, the scraper blades open and take the position shown in FIG. 4 thereby releasing the element and stitch segments for removal by a suitable suction device of well-known construction.

The cycle ends with a seventh phase in which the tape grippers 51, 52 rise to release the fastener chain and the gripper halt at the original elevation where their end faces 55, 56 again form with the guide-path 48 a guide channel for the interengaged element rows of the fastener chain. This completes one cycle of the gapping operation and such is then followed by the first phase in which the fastener chain is transported a predetermined distance L to come into the next working position.

Having thus described the invention, it will be understood that the blank-space section A of the carrier tape may be formed substantially without leaving any residual debris on the surface of the fastener chain which would otherwise considerably retard the speed of production.

I claim:

1. In the manufacture of a slide fastener chain comprising a pair of opposed carrier tapes each carrying a row of fastener elements having coupling head portions intermeshed with coupling head portions of the fastener elements on the other row, and a row of sewing threads securing the fastener elements to the tape, each of said tapes including a blank-space section at predetermined longitudinally spaced-apart intervals, said section consisting of a blank central tape portion and symmetrically disposed element-free stitch portions contiguous therewith and continuing linearly from the row of sewing threads, the method for producing said slide fastener chain which comprises: transporting the fastener chain intermittently under properly timed sequential control; stopping the fastener chain at a predetermined point and holding the fastener chain down; splitting apart opposed edges of the tapes; punching through the coupling head portions of two adjacent intermeshed fastener elements at two longitudinally spaced-apart points to produce a blank-space section devoid of fastener elements; cutting across upper portions of the row of sewing threads on the tapes at two symmetrical points within said blank-space section to form a blank-tape portion; pinching the elements and threads at said blank-tape portion; and scraping the thus pinched elements and threads off the tapes thereby allowing the elements to unravel themselves from the row of sewing threads at terminal ends of said blank-space section.

References Cited
UNITED STATES PATENTS 3,353,256  11/1967  Frolich et al. ———————— 29—408

THOMAS H. EAGER, Primary Examiner

U.S. Cl. X.R.

29—207.5 D